Patented Sept. 20, 1938

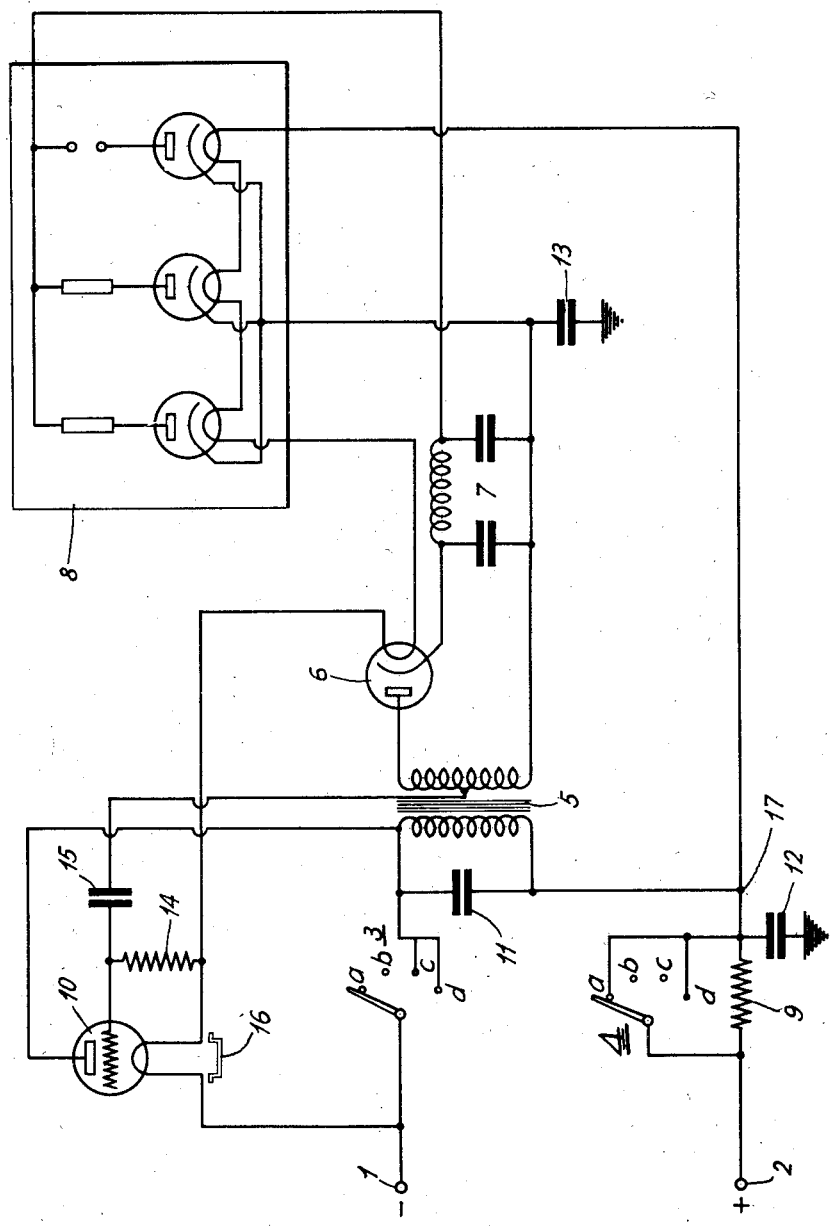

2,130,441

UNITED STATES PATENT OFFICE 2,130,441

POWER SUPPLY SYSTEM

Otto Wohlfarth and Günther de Niem, Berlin, Germany, assignors to Allgemeine Elektricitatz Gesellschaft, Berlin, Germany Application August 16, 1935, Serial No. 36,507
In Germany August 25, 1934

6 Claims. (Cl. 250—27)

So-called all-current amplifiers are known in the prior art in which the filaments of the amplifier tubes and the filament of the rectifier tube required for A. C. operation are connected in series so that the tube may be heated directly or else by way of a series resistance from the supply network regardless of what system or kind of current is concerned. Inasmuch as such all-current receivers are connected without a network transformer, there results a plate potential which in D. C. operation may be substantially below the line or network voltage, and in A. C. operation at the most equal to the line potential. In A. C. operation the voltage is therefore slightly higher than in D. C. working seeing that owing to the use of large condensers after rectification a D. C. voltage higher than the effective voltage may be obtained. The plate potentials obtainable with such universal receivers are not sufficient for present day power or end-stage tubes since these tubes whenever a high undistorted output power is required, require a plate voltage between 250 and 350 v.

Amplifiers of this kind are practically useless in the case of 110-v. supply-lines because the plate voltage of the power tube is lower than that of a standard battery operated set.

Now, the present invention is predicated upon the idea that in an all-current amplifier the plate voltage for the amplifier tube must be equally satisfactory and adapted in any case regardless of system of current and of voltage. Hence, in the case of the plate potential supply, in A. C. operation, a network or mains transformer must be used which produces the requisite alternating voltage and which, in the usual way, is adaptable by re-connection or change of circuit to operation on either 110 or 220 v. For D. C. operation, according to the invention, an auxiliary tube is used whose filament is connected together with the mains transformer. Primary and secondary windings of the transformer are so connected at the grid and the plate of the auxiliary tube that the tube operates as a transmitter. The plate voltage of the auxiliary tube consists of the D. C. of the network. The winding of the mains transformer united with the rectifier tube and which at the same time is arranged as an autotransformer raises the alternating voltage produced by the transmitter to the requisite magnitude. The frequency generated by the auxiliary transmitter may be chosen at will, but it may fall inside the tonal frequency range. The arrangement could also be chosen in such a way that a supersonic frequency is produced so that no special means need to be provided with a view to eliminating the humming noises usually attendant upon mains-connected sets. The auxiliary tube in this instance could be employed also in A. C. operation in which instance it offers the advantage that the means customarily required for smoothing the plate potential may be dispensed with.

A fundamental key diagram is shown in the drawing. The terminals 1 and 2 serve at will for connection with 110 or 220 v. D. C. voltage or alternating voltage mains. The circuit is, of course, suited also for other, abnormal, line voltages. In the instance here shown two switches 3 and 4, according to the line supply voltage and the kind of current must be positioned as follows:

Position $a$ for 110 volts D. C.
$b$ for 220 volts D. C.
$c$ for 220 volts A. C.
$d$ for 110 volts A. C.

The main transformer is denoted by 5 in the drawing. This transformer, contradistinct to the usual mains connected transformers, may be made considerably smaller in size inasmuch as it is called upon the furnish only the low plate energies for the amplifier tubes. The ends of the secondary winding of the main transformer, in the customary way, are brought through a rectifier tube 6 and smoothing means 7 to the amplifier or receiver shown generally at 8 properly so-called. The negative terminal of the output side of the smoothing means 7 is connected to ground through a by-pass condenser 13. The filaments of all of the tubes, as in the exemplified embodiments, are in series directly with the line-supply potential. According to the value of this voltage will a series resistance 9 be either short-circuit or be cut in circuit.

Now, in order that with the use of the all-current or amplifier if D. C. is employed, the desired alternating voltage may be available upon the secondary end of the main transformer, the oscillatory circuit (auxiliary transmitter) with the auxiliary oscillator tube 10 is used according to the invention. The oscillation circuit itself is essentially composed of the primary coil of the transformer 5 and a condenser 11 whose size is governed by the frequency of the said auxiliary transmitter tube. The tube 10 is of the three element type having an anode, a cathode, and a control electrode. The anode-to-cathode circuit is through the primary of transformer 5, while the grid-to-cathode is through a portion of the secondary of transformer 5, it being noted that a connection is provided including a condenser 15 between the grid of tube 10 and a point of the secondary of the transformer 5. The grid is also connected to the cathode through a resistor 14. As previously pointed out, the available source of voltage is connected across the terminals 1 and 2 so that in the event that D. C. operation is desired, the terminals 1 and 2 are connected to the D. C. source so that terminal 2 is maintained at a positive potential with respect to terminal 1. The filament heating circuit for the tubes is grounded through a by-pass condenser 12 as shown.

In operation it will be evident that while the switches 3 and 4 are in the positions denoted by c and d in the drawing the auxiliary tube 10 is short-circuited. Its filament under these conditions may also be short circuited by means of the plug 16. When switches 3 and 4 are in positions a and b the auxiliary tube 10 will be conditioned so as to generate an alternating voltage in the transformer. The resistance 9 is preferably so dimensioned that the same voltage will be available across terminals 1 and 17 irrespective of whether the applied voltage is 110 or 220 volts A. C. or D. C.

Arrangements could also be chosen in such a way that the auxiliary tube stays in circuit also in case of A. C. operation. The frequency to be chosen for the auxiliary oscillator or transmitter should be suitable so that it will be supersonic, for this would require less extensive smoothing means.

We claim:

1. In an amplifier system a plurality of thermionic tubes including indirectly heated cathodes and anodes, said cathodes being provided with heater means, a rectifier provided with an indirectly heated cathode and an anode, heater means for the last named cathode, a circuit including a resistor device and all of the heater means in series, said circuit being adapted to be connected to either a source of direct current energy or a source of alternating current energy to thereby energize all of the heater means, an auxiliary circuit including a transformer for connecting the rectifier to the source of alternating current to thereby rectify energy from the source, a filter connected to the output of said rectifier, connections from the filter to the anodes of the thermionic tubes, a vacuum tube oscillator adapted to be connected through suitable switching means to a source of direct current energy so as to be energized thereby, means for connecting the vacuum tube oscillator to the rectifier whereby the output of the oscillator is rectified and selective switching means for connecting the oscillator to the rectifier through said transformer when in one position and the source of alternating current to the rectifier through said transformer when in another position.

2. An arrangement as described in claim 1 further characterized by that means are provided for adapting the systems for use at different available voltages.

3. An arrangement as described in claim 1 characterized by that the transformer is used as a mains transformer in the case where alternating voltages are employed and as the feed back means for the vacuum tube oscillator when D. C. voltage is employed.

4. In a relay circuit, a plurality of thermionic tubes each of which is provided with an indirectly heated cathode and an anode, a power conditioning circuit for said tubes including a pair of input terminals for connection of the conditioning circuit to either a direct current commercial network or to an alternating current commercial network, a power transformer, switching means for selectively connecting and disconnecting the primary of the transformer across said input terminals, a rectifier tube having an anode and an indirectly heated cathode, means for connecting the anode of the rectifier tube to one end of the secondary of the power transformer, means for connecting the cathode of the rectifier tube to the anodes of the first named thermionic tubes, said means including a choke coil, means for connecting the cathodes of said first named thermionic tubes to the other end of the secondary winding, said last named connection being grounded through a condenser, an oscillator tube including an anode, a cathode and a control electrode, means for connecting the anode to one end of the primary winding of said transformer, the other end of said primary winding being grounded through a condenser element, means connecting the cathode of the oscillator tube to the input terminal corresponding to the end of the primary winding to which the last named anode is connected, means including a condenser for connecting the control electrode of said oscillator tube to a point of the secondary of said transformer, a cathode energizing circuit for the oscillator tube and a grid leak means connected between the control electrode and cathode of the oscillator tube.

5. In a relay circuit, a plurality of thermionic tubes, each thereof being provided with an indirectly heated cathode and an anode, a power conditioning circuit for energizing the tube elements including a pair of input terminals for connection of the conditioning circuit to either a direct current commercial network or to an alternating current commercial network, a power transformer, switching means for selectively connecting and disconnecting the primary of the transformer across said input terminals, a rectifier tube having an anode and an indirectly heated cathode, means for connecting the anode of the rectifier tube to one end of the secondary of the power transformer, means for connecting the cathode of the rectifier tube, and including a choking device for connecting the cathode of the rectifier tube to the anodes of the first named thermionic tubes, a filter condenser connected between the anode and cathode of the rectifier tube, heater elements for the cathode of the rectifier tube and the cathodes of said thermionic tubes, said heater elements being connected in series across said input terminals whereby the heater elements are energized upon connection of the input terminals to either a direct current network or alternating current network, an oscillator tube having an anode, a cathode and a control electrode, external circuits including the power transformer for forming input and output circuits for the oscillator tube, said power transformer acting to couple the output circuit to the input circuit and thereby facilitate the transfer of energy from the output circuit of the oscillator tube to the input circuit thereof for producing oscillations, said switching means being arranged to connect said oscillator tube across the input terminals when the primary of the tube transformer is disconnected by the switching means and to short circuit the oscillator tube when the primary of the transformer is connected across the input terminals by operation of the switching means.

6. In a power conditioning circuit for energizing the tube elements of electronic relays, a thermionic oscillator tube including an anode, a cathode and a control electrode, a pair of terminals for connection to a direct current network or an alternating current network, one of said terminals being a positive terminal and the other thereof a negative terminal in direct current network operation, a transformer having a primary winding and a secondary winding, an anode to cathode circuit for said tube including the primary winding of said transformer, a control electrode to cathode circuit for said tube including a capacity and at least a portion of the secondary of said transformer, said transformer being arranged so as to facilitate the transfer of energy from the anode to cathode circuit to the control electrode to cathode circuit for generating oscillations, a cathode energizing circuit for said tube connected between the positive and negative terminals, a rectifier tube, said tube including an anode and a cathode, a positive output terminal and a negative output terminal for said rectifier tube, and adapted to have a load circuit connected thereto, means for connecting the cathode of the rectifier tube to the positive output terminal, said means including a choke, means including the secondary of said transformer for connecting the anode of the rectifier tube to the negative output terminal, a filter condenser connected across the anode and cathode of the rectifier tube, and means for adapting said power conditioning circuit for connection across an alternating current network comprising circuit means for connecting the primary of said transformer directly across said first named pair of terminals.

OTTO WOHLFARTH.
GÜNTHER DE NIEM.